United States Patent [19]

Frye et al.

[11] Patent Number: 5,148,070

[45] Date of Patent: Sep. 15, 1992

[54] APPARATUS FOR COMMUTATION OF AN ELECTRIC MOTOR

[75] Inventors: Jesse C. Frye, Mooresboro, N.C.; Scott G. Bradshaw, Easley, S.C.

[73] Assignee: Platt Saco Lowell Corporation, Greenville, S.C.

[21] Appl. No.: 752,734

[22] Filed: Aug. 30, 1991

[51] Int. Cl.⁵ .................. H02K 11/00; H02K 19/24
[52] U.S. Cl. ................... 310/168; 310/68 B
[58] Field of Search ............ 310/68 B, 68 R, 168, 310/199, 224, 269, 106

[56] References Cited

U.S. PATENT DOCUMENTS

| | | | |
|---|---|---|---|
| 3,560,817 | 2/1971 | Amato | 318/138 |
| 4,259,603 | 3/1981 | Uchiyama et al. | 310/68 B |
| 4,785,242 | 11/1988 | Vaidya et al. | 324/208 |
| 4,968,913 | 11/1990 | Sakamoto | 310/156 |
| 4,995,159 | 2/1991 | Hancock et al. | 29/596 |
| 5,038,065 | 8/1991 | Matsubayashi et al. | 310/162 |
| 5,053,662 | 10/1991 | Richter | 310/90.5 |

FOREIGN PATENT DOCUMENTS

0117459 7/1983 Japan ..................... 310/168

Primary Examiner—Steven L. Stephan
Assistant Examiner—Dennis R. Haszko
Attorney, Agent, or Firm—Luke J. Wilburn, Jr.

[57] ABSTRACT

A variable reluctance motor having improved means for detecting the relative position of the rotor and stator during rotation of the rotor whereby signals may be employed to commutate the motor, comprising sensed means on the rotor including four sets of elements, each set located within an arcuate length of 90° and each set having two sensed portions with leading edges in the direction of rotation being separated by alternating arcuate lengths of 30° and 60°. Sensing means comprising two sensors arcuately separated by 30° times n wherein n is 1, 2, 4, or 5 are located adjacent the path of rotation of the sensed elements. In a preferred embodiment, the sensed means is a permanent ring magnet having unequal alternating arcuate North and South pole lengths, and the sensing means are two Hall effect sensors. Commutation of a three-phase motor having four rotor poles and six stator poles can thus be effected with the use of only two sensors.

4 Claims, 12 Drawing Sheets

APPARATUS FOR COMMUTATION OF AN ELECTRIC MOTOR

This invention relates to an electric motor having improved means of control, and, more particularly, to a variable reluctance (VR) motor having improved means for providing signals during operation of the motor to indicate the relative position of the rotor and stator components thereof.

BACKGROUND OF THE INVENTION

Brushless DC motors without permanent magnets often are interchangeably referred to as switched reluctance (SR) or variable reluctance (VR) motors. Reference to a VR motor herein is intended to include both terminologies. A VR motor has two sets of salient poles, one set on the stator which has phase windings around the poles and another set on the rotor which has no windings. The stator phase windings are sequentially energized with current pulses to rotate the rotor which is connected to a shaft output. The stator phase windings are sequenced, or commutated, by signals from a rotor position sensor. The rotor position sensing means may comprise optical sensors or magnetic sensors of the Hall effect type. The sensors typically are mounted in fixed position on the stator or motor housing adjacent the path of rotation of the rotor, and the sensed means are fixed for rotation with the rotor.

In a typical three-phase, VR motor, three Hall effect sensors may be located 120° arcuately apart, centered about the rotor shaft, and are fixed either directly to the stator or to some fixture which locates them according to some known relationship with respect to the stator. A magnetic ring with four North regions and four South regions alternating in 45° radial arcs of the ring are attached to the rotor or rotor shaft and serve as sensed means so that when the rotor rotates, sensor output signals can be used to directly commutate, i.e., cut on and off, the current to each of the motor phase windings as they locate each and every pole alignment.

VR motors have been proposed for driving the individual spindle assemblies of a textile yarn ring spinning frame. In such spindle assemblies, the rotor of the motor is mounted on the spindle shaft which supportably rotates a yarn collection member, such as a bobbin, during the spinning operation. A ring rail with ring and traveler reciprocates vertically along the support bobbin to wind the yarn package. The lower end of the spindle support shaft is supported for rotation in a bolster section which has an outer housing mounted in fixed position to a spindle assembly support rail of the spinning frame. The stator of the VR motor is disposed in surrounding relation to the rotor and is mounted in fixed position in a housing supportably attached in suitable manner to the bolster housing or support rail of the ring spinning frame.

In a paper entitled "Four-Quadrant Brushless Reluctance Motor Drive" by T. J. E. Miller et al., presented at IEE Conference on Power Electronics and Variable Speed Drives, London, July 1988, there is suggested that the simplest possible bi-directional scheme for a three-phase motor uses only two sensors (Hall or optical). A paper entitled "A New Control IC For Switched Reluctance Motor Drives" by T. J. E. Miller et al., presented at IEE Power Electronics and Variable Speed Drive Conference, London, July 1990, states that the internal commutation logic of a VR motor can operate with shaft position signals derived from either 3 or 2 Hall or optical sensors.

The use of three Hall effect sensors to detect and commutate a three-phase motor of the VR type, as in the prior art, works well; however, it is advantageous to use as minimum a number of sensors as possible to decrease the expense of the system as well as decrease the mean-time-to-failure for a system that results from the use of additional sensing means.

BRIEF OBJECTS OF THE INVENTION

It is therefore an object of the present invention to provide an improved VR motor having more economical means for detecting rotor/stator positions to provide motor control signals for commutation.

It is another object to provide an improved method of controlling a VR motor of the type described by providing signal information as to the relative position of the rotor and stator.

BRIEF DESCRIPTION OF THE DRAWINGS

The above listed objects as well as other objects of the present invention will become more apparent and the invention will be better understood from the following detailed description of preferred embodiments of the invention, when taken together with the accompanying drawings, in which.

SUMMARY OF THE INVENTION

The present invention is directed to a VR motor having improved means for detecting the relative position of the rotor and stator during rotation of the rotor whereby signals may be employed to commutate the motor in response thereto. More specifically, the invention involves the use of sensed means mounted for rotation on the rotor and disposed about the axis of rotation of the rotor, and sensing means mounted in arcuately fixed, spaced positions adjacent the path of travel of the rotating sensed means to detect its passage thereby. The sensed means comprises four sets of elements, each set located within an arcuate length of 90° and each set having two sensed portions. Each sensed portion has a leading edge in the direction of rotation, with the leading edges of the sensed portions of the sets being separated by alternating arcuate lengths of 30° and 60°. The sensing means comprises two sensors arcuately separated by 30° times n, wherein n is 1, 2, 4, or 5. Thus, the two sensors can be located at arcuately spaced intervals of 30, 60, 120, or 150 degrees.

In a preferred embodiment of the invention, a permanent ring magnet having unequal, alternating, arcuate North and South pole lengths is mounted for rotation with the rotor. Complementary sensing means, such as Hall effect sensors, arcuately spaced as above defined and fixed against rotation provide signals for the sensed passage of the magnetic poles of opposite polarity on the magnetic ring to control commutation and other functions of the motor. In particular, with a four-rotor pole, six-stator pole, three-phase VR motor, it has been found that an eight-pole ring magnet of alternating North and South poles of unequal arcuate pole lengths, i.e., 60° and 30°, may be sensed by the use of only two Hall effect sensors arcuately spaced adjacent the path of rotation of the magnetic ring 30° apart to provide 360° electrical signals for three-phase commutation of the motor.

Instead of magnetic sensing means, optical sensing means may be employed within the parameters of the present invention, utilizing a rotor-mounted ring shutter having alternating blocking walls and openings of unequal length, i.e., 30° and 60°, as the sensed means, and two light source optical interrupter sensors, disposed arcuately 30° apart for the two Hall effect sensors.

DETAILED DESCRIPTION OF PREFERRED EMBODIMENTS

Figure 1:
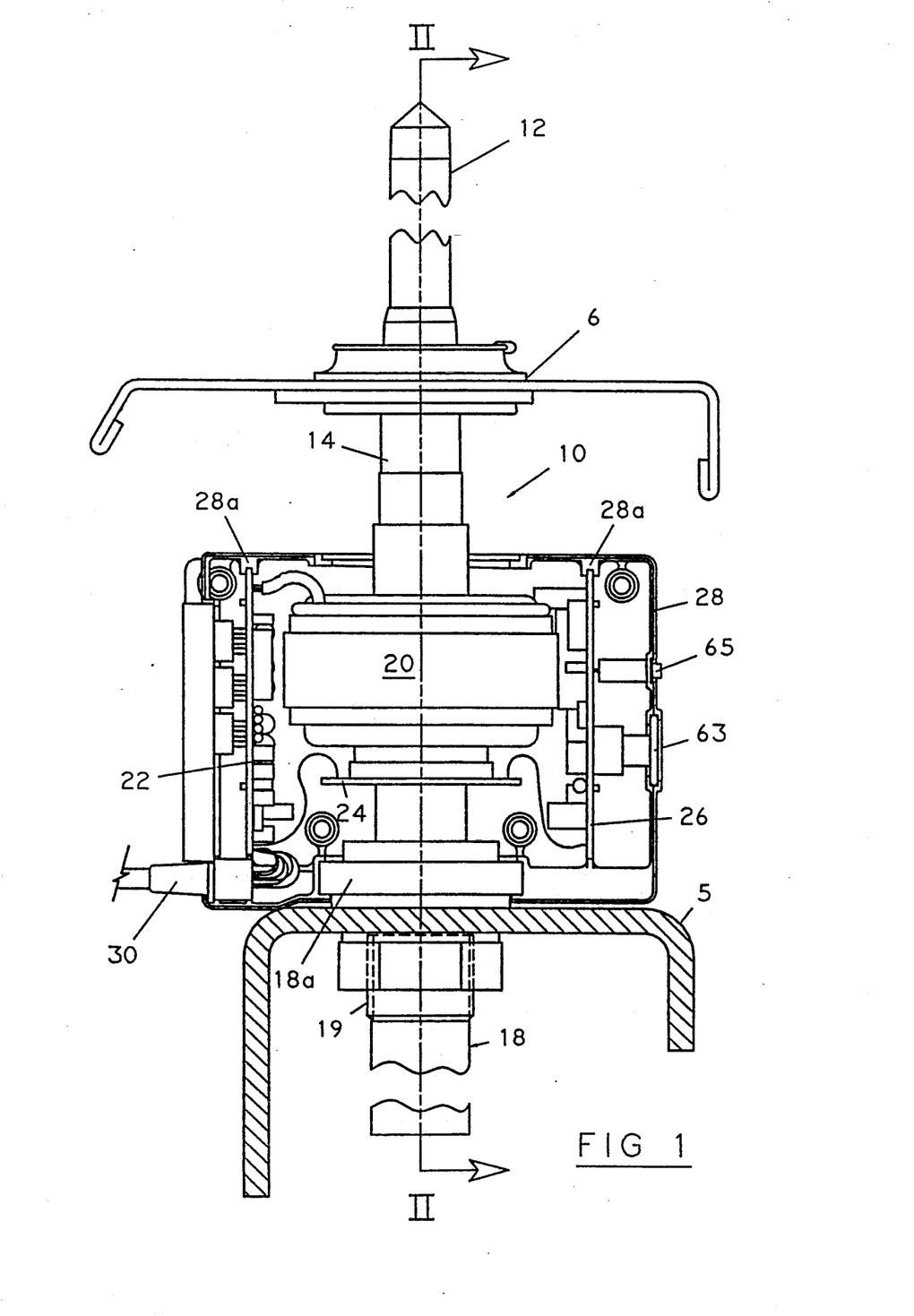
FIG. 1 is an elevation view of a motor-driven spindle assembly of a textile ring spinning frame, with a side cover plate of the spindle motor housing removed to show the motor and motor control circuit boards located in the housing.

Referring more particularly to the drawings, the motor and motor control features of the present invention may be explained in reference to use of the same in a textile ring spinning operation and apparatus. FIG. 1 is an elevation view of a motor-driven spindle assembly 10, such as may be employed at each winding position on a textile ring spinning frame. Such a spinning frame is schematically illustrated in FIG. 1 and includes a support member 5 of a ring spinning frame, and a vertically reciprocatable ring rail, ring, and traveler 6.

Figure 2:
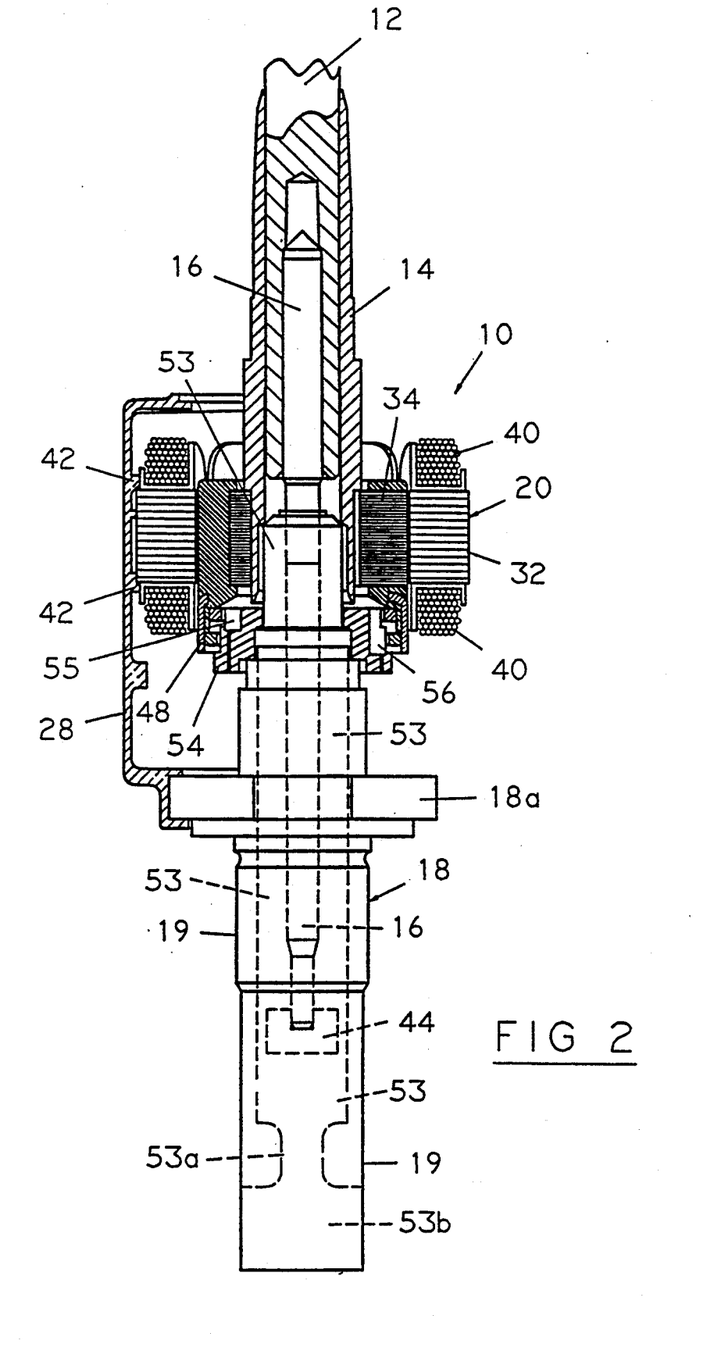
FIG. 2 is a left side, partial elevation view of the motor-driven spindle assembly as seen in FIG. 1, with portions of the spinning frame elements, motor housing, and the circuit boards removed, and with portions of the motor and housing shown in vertical section taken generally along Line II—II of FIG. 1.
Figure 2A:
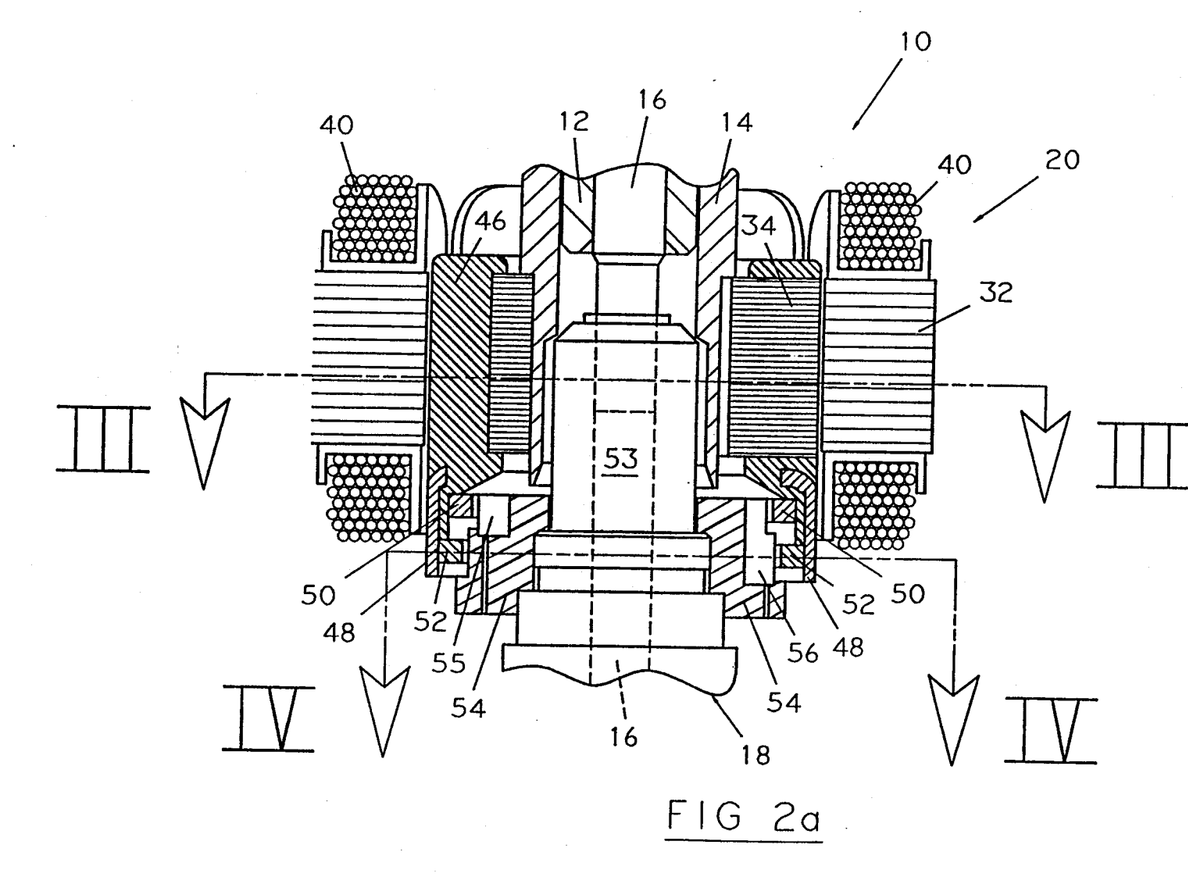
FIG. 2a is an enlarged view of a central portion of the vertical section view of the spindle assembly seen in FIG. 2.

As shown in FIGS. 1, 2, and 2a, the spindle assembly 10, portions of which have been removed for convenience, includes yarn package-receiving means comprising shaft means including a sheath 12, a rotor sleeve 14, and a spindle blade 16 mounted for rotation in a supporting bolster section 18. Bolster section 18 includes an outer housing 19 which is mounted in fixed position on horizontal support member 5 of a spinning frame. Surrounding the rotational axis of the spindle assembly are the conventional ring rail package builder 6 and shaft means drive means which includes a VR motor 20. Motor 20, and motor control means, the components of which are mounted on electrically connected electronic circuit boards 22, 24, and 26, are located in a protective housing 28 which is supportably attached in fixed position to a flange portion 18a of the bolster section.

As seen in FIG. 1, circuit boards 22 and 26 are supportably mounted in trackways 28a of the housing and circuit board 24 is supportably mounted on an upper end portion of bolster section 18 in spaced relation to the lower end of motor 20. The motor and motor control system components located on the circuit boards receive power and further control signals from a power supply and a master controller for the ring spinning frame (not shown), through a power and communication supply line 30.

Figure 3:
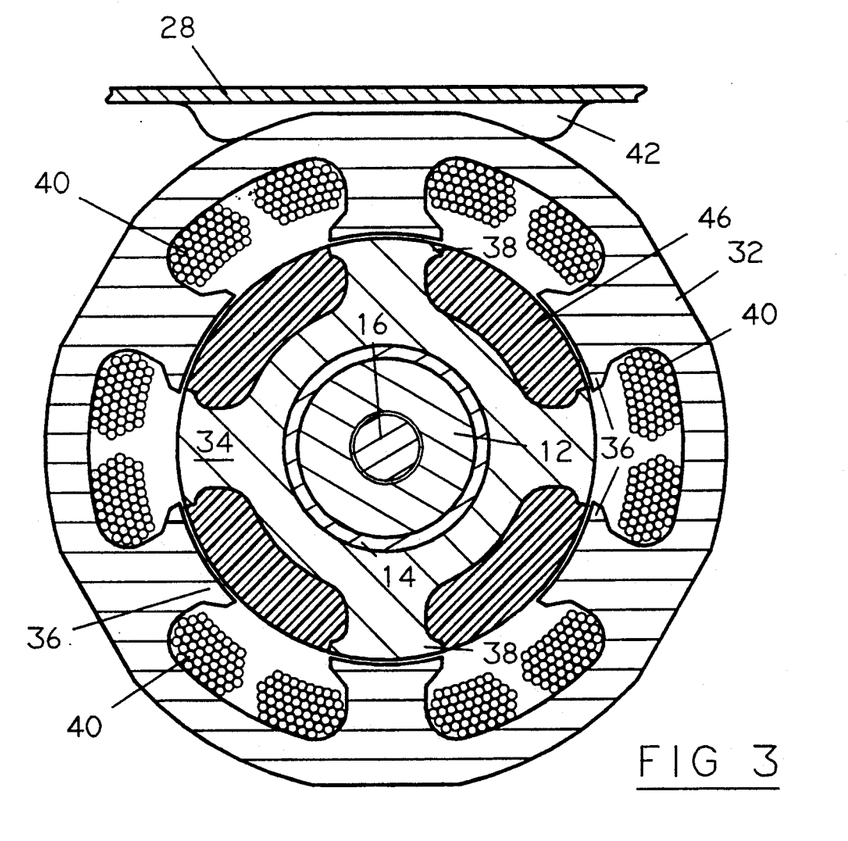
FIG. 3 is a horizontal cross-sectional view of the spindle assembly, taken generally along Line III—III of FIG. 2a and looking in the direction of the arrows.

FIG. 2 is a left side elevation view of the spindle assembly of FIG. 1, with circuit boards and portions of the motor housing removed. Portions of the motor 20, sheath 12, and rotor sleeve 14 are shown in vertical section. Referring to FIGS. 2, 2a, and 3, the VR motor 20 comprises a stator 32 and rotor 34. Stator 32 is composed of laminated sheets of steel and has six salient inwardly facing poles 36. Rotor 34 is composed of laminated steel sheets and has four outwardly facing salient poles 38 (FIG. 3). Stator poles 36 are provided with phase windings 40, with radially opposed pairs of salient stator poles being wound in series to form a three-phase motor. The phase windings of the stator are sequentially energized with current pulses to create a magnetic field and attract the rotor poles adjacent thereto, causing rotation of the rotor, rotor sleeve, and sheath.

As best seen in FIGS. 2 and 3, the stator is supported in fixed position in the motor housing 28 on inwardly protruding stator support ledges 42 of the housing. Rotor 34 of the motor is supportably mounted for rotation inside the stator through its fixed attachment to rotor sleeve 14 which is fixed for rotation with the sheath 12. Sheath 12 is in turn fixed for rotation with blade 16, the lower end which is supported for rotation in a bearing cup 44 located in a lower portion of bolster section 18.

Spaces between salient rotor poles are filled with nylon plastic material 46 (FIGS. 2a and 3) in which a metal ring 48 is supportably embedded for rotation with rotor 34. Adhesively secured within metal ring 48 are upper and lower magnetic rings 50, 52. Magnetic rings 50, 52 thus rotate with rotor 34 about the central longitudinal axis of the spindle assembly during motor operation.

Figure 4:
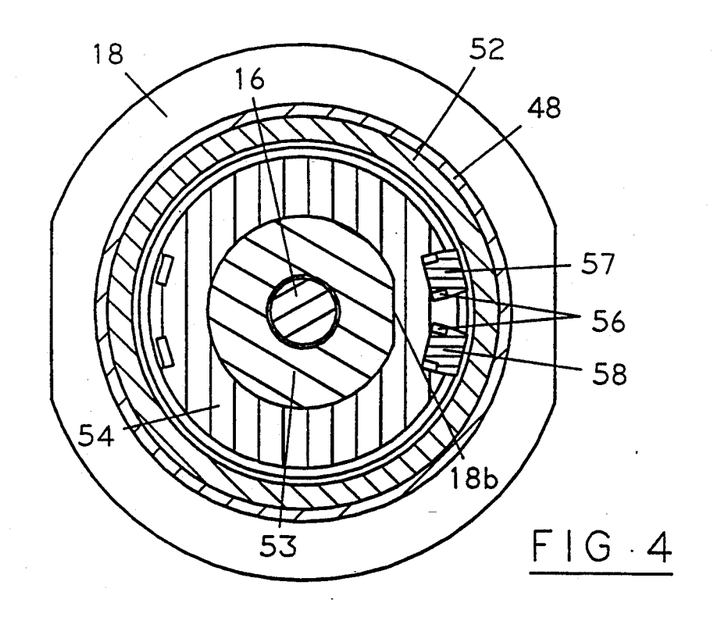
FIG. 4 is a horizontal cross-sectional view of the spindle assembly, taken generally along Line IV—IV of FIG. 2a and looking in the direction of the arrows.

Fixedly mounted to an upper end portion of an internal sleeve member 53 of bolster section 18 is a molded plastic ring 54 which serves to support sensing means which operate in conjunction with the rotating magnetic rings 50, 52 to provide signal information for velocity control and commutation of the motor phase windings, respectively. Support ring 54 is positively fixed in its angular position surrounding an upper end portion of sleeve member 53 of bolster section 18 by mating, flattened sections, seen at 18b, on the bolster sleeve member 53 and ring 54 (FIG. 4). Located in vertically spaced, horizontal planes in support ring 54 are arcuately disposed pairs of pockets 55, 56 (one of each pair seen in FIG. 2a). Each of the two pairs of pockets receive and positively fix the position of sensing means, such as conventional, latched Hall effect sensors, on sleeve 53. Two Hall effect sensors (not shown in pockets in FIG. 2a) are located in two 30° arcuately spaced pockets 55 adjacent the upper magnetic ring 50 for velocity sensing. Two Hall effect sensors 57, 58 (FIG. 4) are correspondingly located in 30° arcuately spaced pockets 56 adjacent the lower magnetic ring 52 to sense the passage of alternating magnetic poles of ring 52 for commutation of the motor phase windings. (See FIGS. 2a, 4, and 5).

Details of the means for mounting the sensing means on the upper end of sleeve member 53 and relative to the path of rotation of the magnetic rings 50, 52 during motor operation form the subject matter of a commonly assigned co-pending application entitled "Improved Motor Driven Spindle Assembly for Ring Spinning," Ser. No. 07/752,377 filed Aug. 30, 1991.

Figure 5:
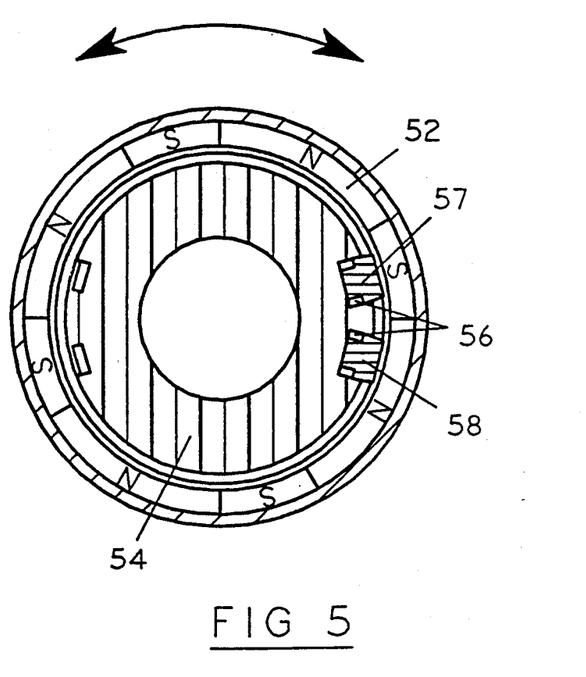
FIG. 5 is a schematic representation of the spindle assembly, as seen in FIG. 4, illustrating the positional arrangement of the means for determining rotor/stator positions of the motor for commutation of the motor which forms the subject matter of the present invention.

FIGS. 4 and 5, which are cross-sectional and schematic views taken generally along Line IV—IV of FIG. 2, show the rotor/stator position detection means which provide signal information for commutation of the phase windings of the three-phase VR motor 20. As illustrated in FIG. 5, magnetic ring 52 which is mounted for rotation with rotor 34 has alternating North and South poles of unequal arcuate pole lengths, i.e., 60° and 30°, throughout the 360° extent of the ring. During rotor rotation, the passage of the alternating poles of unequal length are sensed by the two arcuately spaced Hall effect sensors 57, 58 which are fixed against rotation in sensor support ring 54 attached to bolster sleeve insert 53. Sensors 57, 58 are arcuately spaced 30° apart, adjacent the path of rotation of magnetic ring 52.

Figure 6:
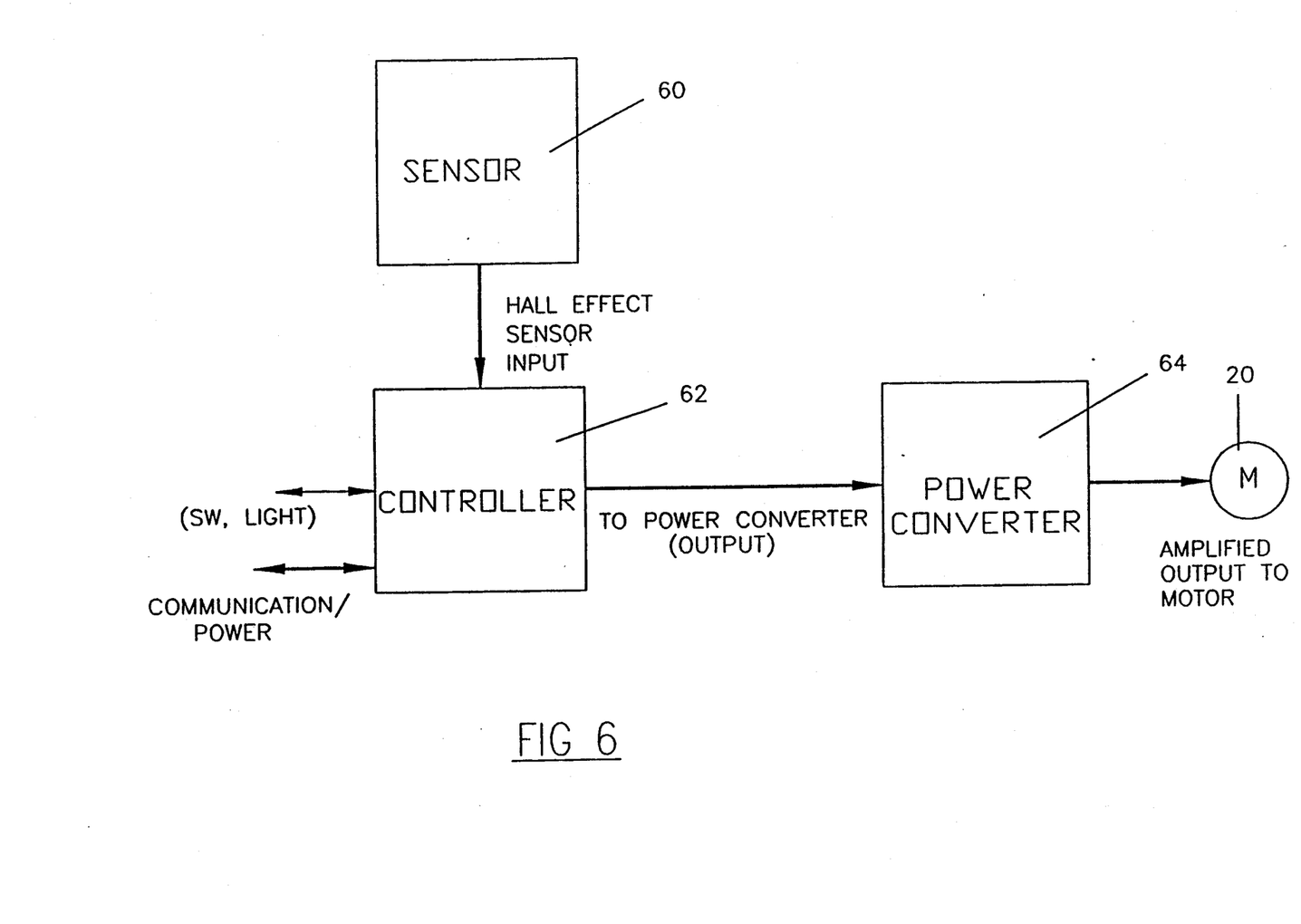
FIG. 6 is an illustrative block diagram showing principal sections of the motor control system of the present invention.

The closed loop motor control system for operating VR motor 20 may best be described and understood by reference to FIGS. 6 through 9 of the drawings which are block diagrams illustrating operative interconnection of the major sections and components of the control system. As seen in FIG. 6, the control system principally comprises three sections, a sensor section 60 for sensing rotor velocity and stator/rotor position of the motor, a controller section 62, and an amplifier, or power converter, section 64. The component parts of sensor section 60 are located conveniently on circuit board 24, as seen in FIG. 1. Controller section 62 component parts are located conveniently on circuit board 26, and component parts of power converter section 64 are located on circuit board 22.

Figure 7:
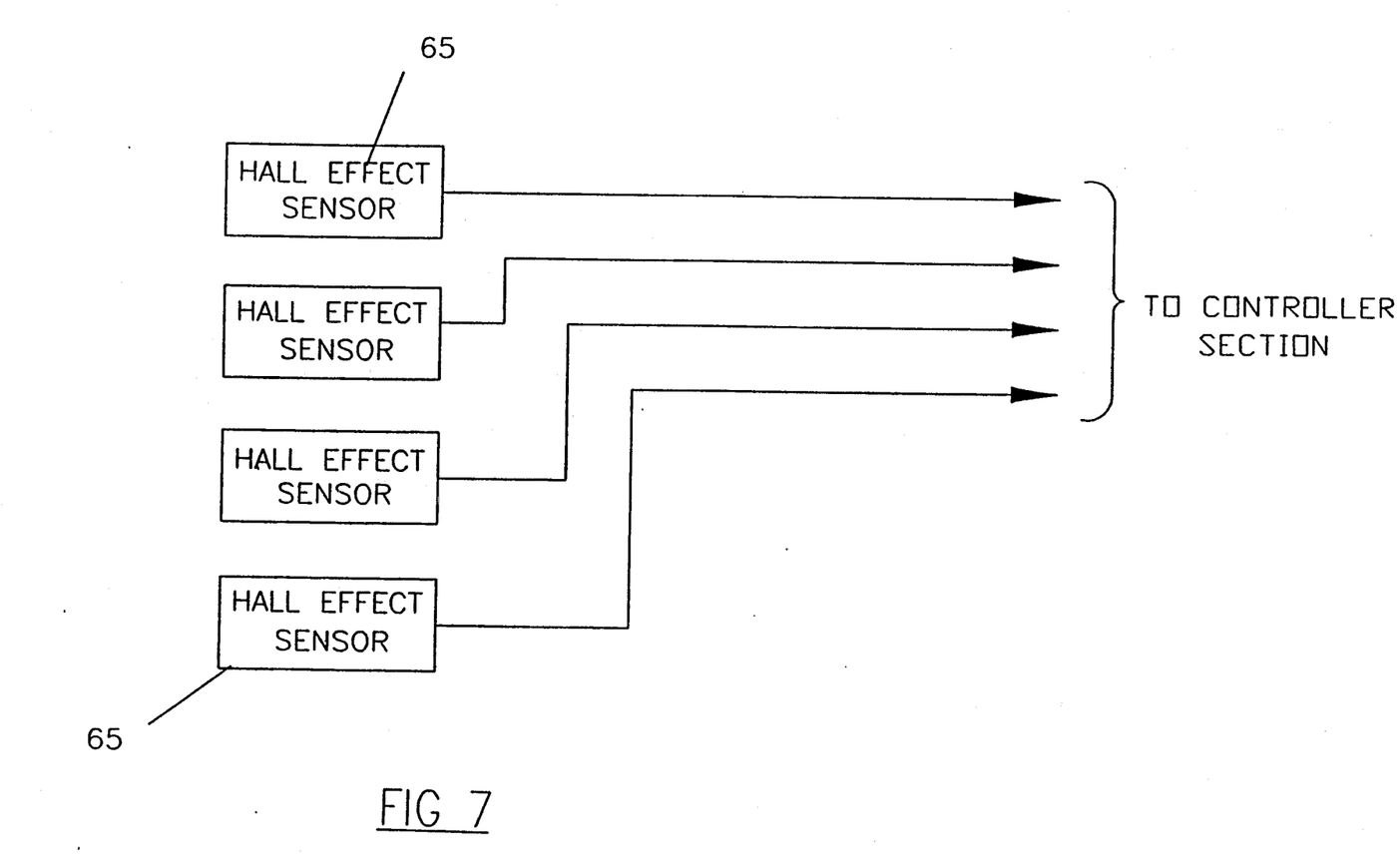
FIG. 7 is an illustrative block diagram showing components of the sensor section of the motor control system shown in FIG. 6.

As seen in FIG. 7, sensor section 60 for detecting velocity and rotor/stator position of the motor during operation contain four sensor means, such as four Sprague UGN 3135 U, latched, Hall effect sensors 65, and four Allen-Bradley RC07GF332J 3.3 KOHM, ¼ watt resistors for pulling up the open collector output of the sensors. As described, these sensors sense the passage of the alternating North and South poles of the two ring magnets 50, 52 attached to the rotor. One set of two Hall effect sensors in 30° arcuately spaced pockets 55 (one pocket seen in FIG. 2a) sense passage of equal length North and South poles of a 60 pole ring magnet 50 to provide a 120 line quadrature encoder for motor velocity control. The second set of Hall effect sensors 57, 58 (FIGS. 4 and 5) in pockets 56 sense the North and South poles of magnet 52 to provide signals for commutation.

Figure 8:
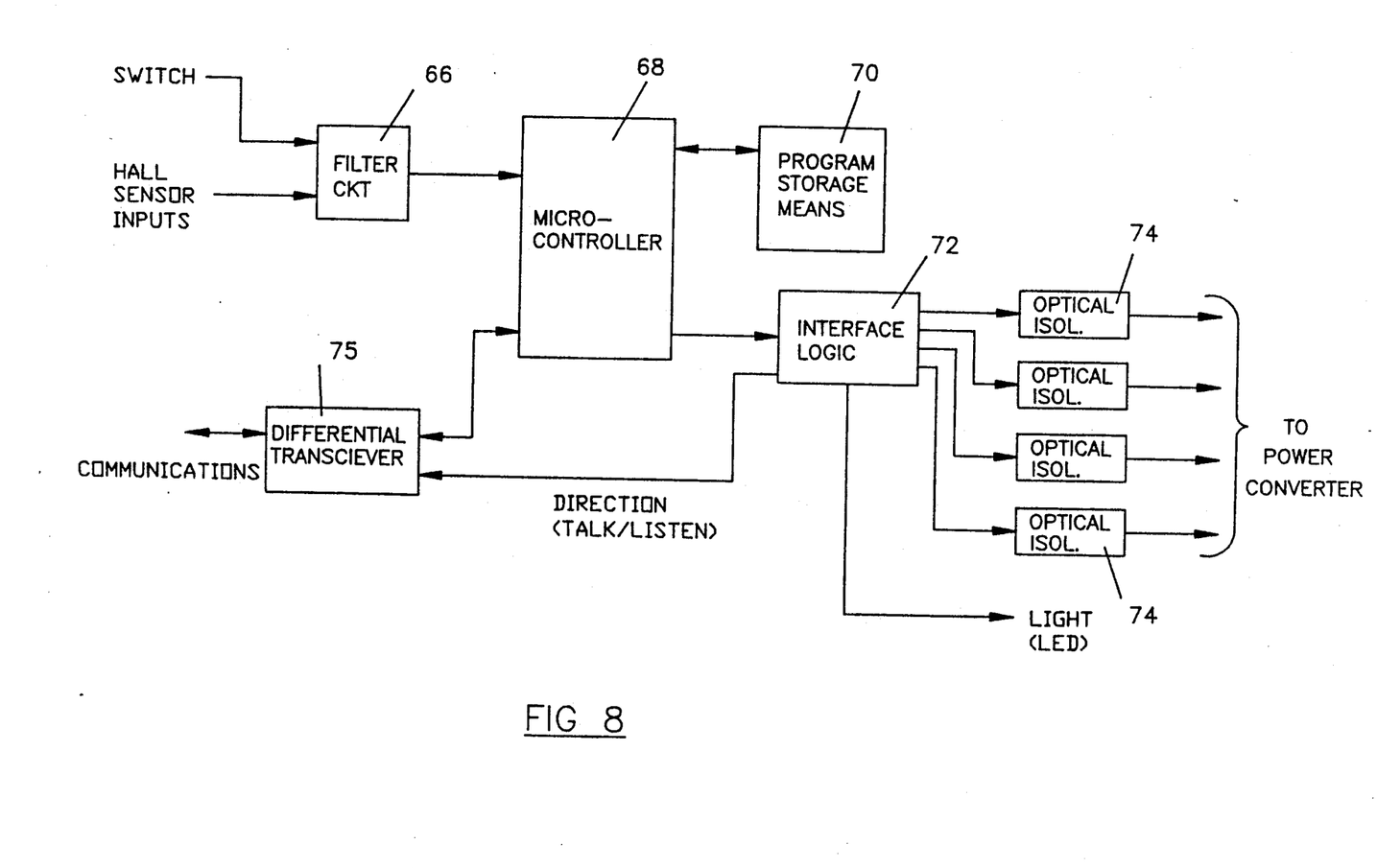
FIG. 8 is an illustrative block diagram showing components of the controller section of the motor control system shown in FIG. 6.

Controller section 62 components, as seen in FIG. 8, include a filter circuit 66 for receiving input signals from the sensor section 60, and for transmitting such signals, after filtering, to a microcontroller 68 which processes and executes a control program supplied thereto from program storage means 70, such as a ROM or EPROM. Process information from microcontroller 68 is processed through an interface logic component 72 and transmitted via optical isolators 74 to power converter section 64 of the control system.

Controller section 62 contains the circuits which perform velocity control, input, output, and commutation functions. Typically the filter circuit 66 in this section may comprise four Kemet C315C103M5U5CA 0.01 uF 50 Volt radial lead ceramic capacitors for filtering the incoming Hall effect sensor signals, and a National Semiconductor 74HC14N Hex Schmitt Triggered Inverter for sharpening the edges of the filtered signals from the Hall effect sensors and the output signal from a manual off/on switch 63 (FIG. 1) of the motor 20, such as an ITT-Schadow D602-01 momentary single-pole-single-throw (normally open) push-button switch. The Schmitt Triggered Inverter also buffers the control signal for an indicator light 65 (FIG. 1), such as a Light Emitting Diode.

Microcontroller 68 may be an Intel N80C194 16 bit, 12 MHz microcontroller processor which executes the control program stored in storage means 70, which may be an Intel N87C257-170V10 latched EPROM.

In the interface logic 72, a National Semiconductor 74HCO8N quad AND gate provides multiplexing and interface functions for the output signals from the microcontroller to the four optical isolators 74, which may be Motorola MOC5008 optical isolators. A National Semiconductor 74HC174N hex D flip flop is connected to the multiplexed address/data bus of the microcontroller 68 in order to latch outputs which control a differential transceiver 75, which may be a National Semiconductor UA 96176 RS-485 transceiver, and the LED 65 (FIG. 1). Three Allen-Bradley RC07GF332J 10 KOhm ¼ Watt resistors are used to pull up two unused high impedance inputs and to bias the receive data line to a logical one. A Kemet T350B685MO10AS 6.8 uF tantalum 20 Volt radial lead capacitor is used to provide the power-up reset RC time constant. Two Kemet C315C330K2G5CA 33 pF ultra-stable ceramic 200 Volt radial lead capacitors are used in conjunction with a 12.0000 MHz crystal to form the oscillator circuit providing the 12 MHz timebase for the microcontroller. An Allen-Bradley RC07GF121J 120 Ohm ¼ watt resistor is used to terminate the differential pair communications line. Eight Kemet C315C104M5U5CA 0.1 uF 50 Volt ceramic radial lead capacitors, one Kemet T350A105M020AS1 uF tantalum 20 Volt radial lead capacitor and one Kemet T350F336M010AS 33 uF tantalum radial lead capacitor are used for general decoupling throughout the controller circuit to minimize noise transients.

Figure 9:
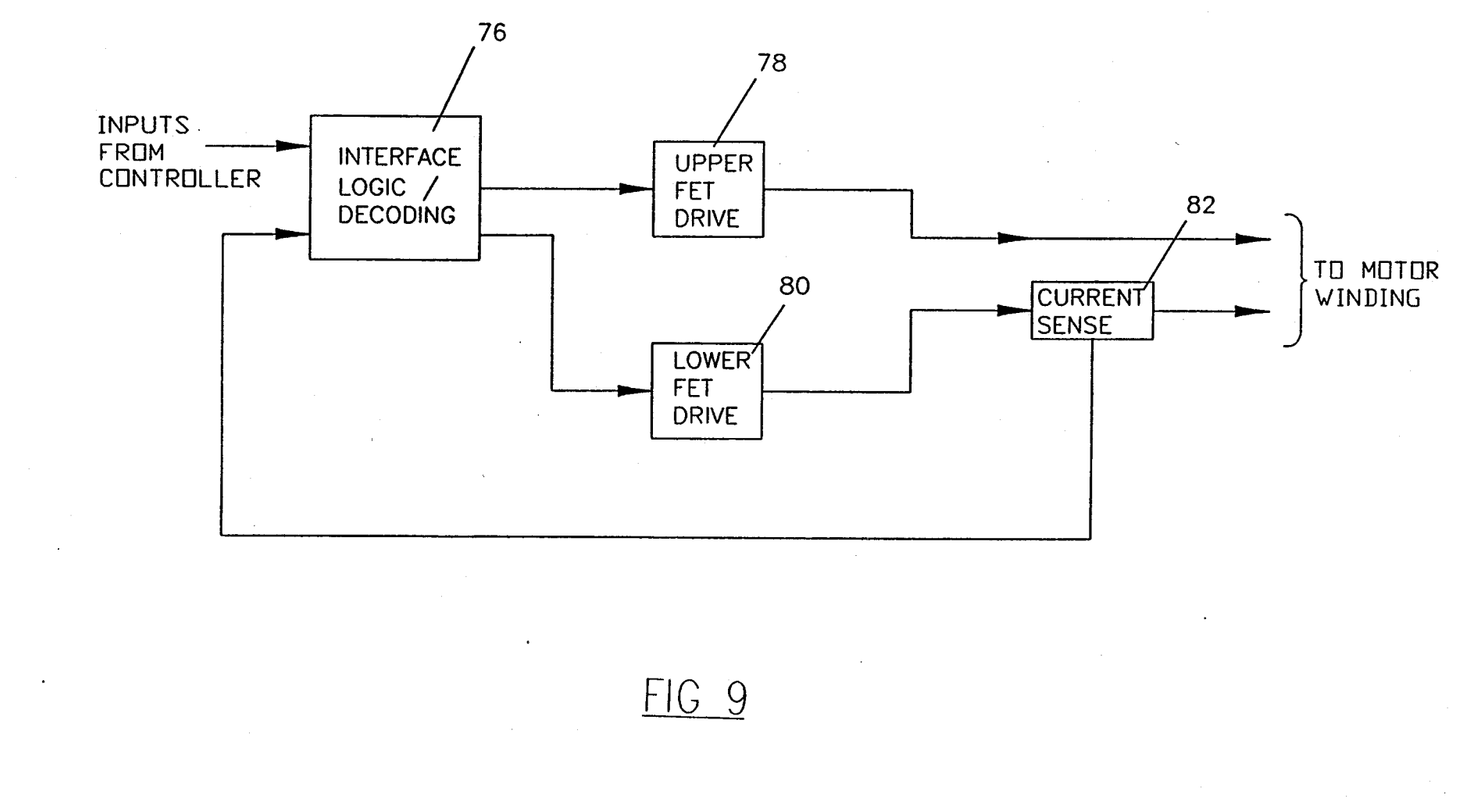
FIG. 9 is an illustrative block diagram showing components of the power converter section of the motor control system shown in FIG. 6.
Figure 10:
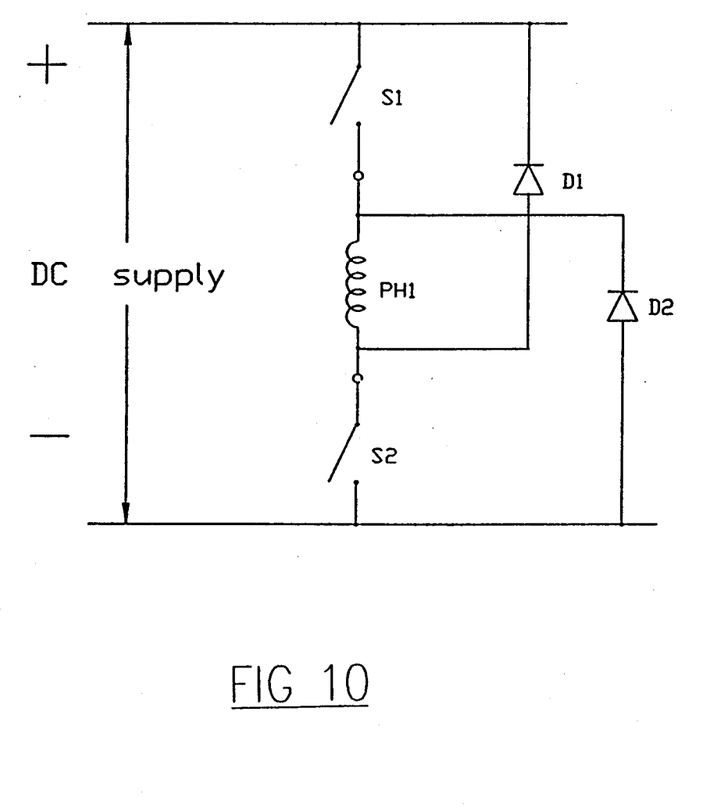
FIG. 10 is an electrical schematic diagram of one of the switch means components of the power converter section of the motor control system showing the switch arrangement for supplying current to one phase winding of the spindle assembly drive motor.

As shown in FIG. 9, inputs from the four optical isolators 74 of the controller section 62 pass through an interface logic/decoder 76 of the power converter section 64 to upper and lower motor winding switch means 78, 80, which may consist of a plurality of field effect transistors each having an associated circuit for turn-on and turn-off. Operation of the switch means supplies current to the three phase windings of VR motor 20. Three of the four optically isolated signals from the controller section 62 control the motor phases directly and interface to a quad OR gate (such as a National Semiconductor 74C02N) in decoder 76 which allows the windings to be turned off in the event of over current. These phase control signals are buffered by a line driver (such as a National Semiconductor 74C240N) in decoder 76 and then operate switches S1 and S2 of each phase winding circuit PH1, as illustrated in FIG. 10. These switches may be three International Rectifier IRF 730 N channel Field Effect Transistors in the lower switch means 80 and three Motorola MTP2P45 P channel FETs in the upper switch means 78 (FIG. 9).

Ultra fast recovery diodes D1, D2 (FIG. 10), such as Motorola MUR 440 diodes, are used as regeneration diodes. They allow the energy stored in the winding to be returned to the supply when the winding is turned off.

The current limit component 82 of the power converter is implemented using four operational amplifiers such as a National Semiconductor LM324N quad operational amplifier integrated circuit. In conjunction with the appropriate commercially available resistors, a voltage, which is proportional to the current in the motor windings, is compared to some reference voltage and an output signal which causes switches S1 and S2 to be turned off is generated if the current in the motor windings exceeds the maximum allowed current.

Figure 5A:
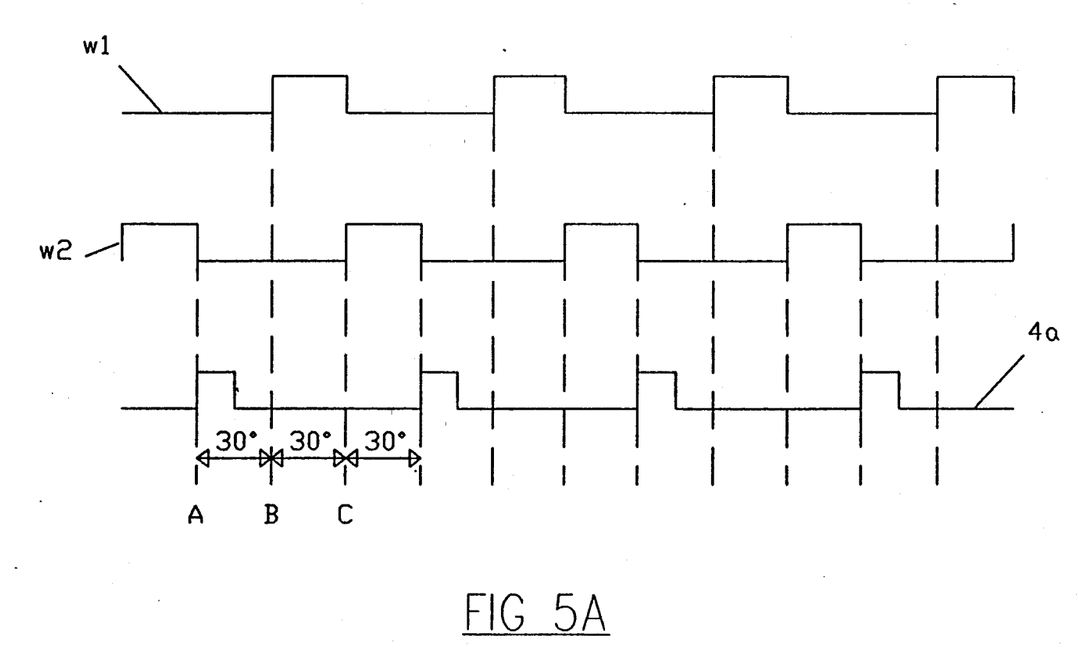
FIG. 5a is a waveform diagram illustrating output signal information supplied from two Hall effect sensors to indicate rotor/stator positions of the motor.

FIG. 5a is a waveform diagram illustrating output signal information supplied from the two Hall effect sensors to indicate rotor/stator positions of the motor for three phase commutation of the same. The two Hall effect sensors, 57 and 58, positioned 30° angularly apart adjacent the path of rotation of the magnetic ring 52, which has unequal alternating North and South pole widths as depicted in FIG. 5, provide waveform signal outputs, as shown in waveforms W1 and W2. Signals may be generated for commutation of a three-phase six-stator pole/four-rotor pole VR motor at points A, B, and C on commutation waveform 4a, to provide signal information every 30° of rotation of the rotor. This provides for effective commutation of the phases of the motor without the necessity of three Hall effect sensors for detection and signal generation.

From the foregoing detailed description of the present invention, it can be seen that a three-phase VR motor of four rotor pole/six stator pole construction may be effectively commutated by the use of only two sensing means, such as Hall effect sensors, spaced 30° arcuately apart adjacent the path of travel of sensed means. The sensed means may comprise four sets of elements on a magnetic ring, each set comprising an alternating North and South pole segment located within an arcuate length of 90° of the ring. Each 90° North pole/South pole set has two sensed portions, each having a leading edge in the direction of rotation of the magnetic ring. The leading edges of the sensed portions of the sets are separated by alternating arcuate lengths of 30° and 60°, whereby signals may be generated every 30° of rotation of the rotor for commutation of the phase windings. The ring magnet of the preferred form of the invention, as shown in FIG. 5, has alternating North and South pole portions in which the magnetized pole portions of the ring span the entire circumference of the ring in alternating 30° and 60° arcuate lengths. This permits the use of unlatched Hall effect sensors which provide signals at each change of polarity about the circumference of the magnetic ring. If desired, latched Hall sensors might be employed whereby the actual alternating North and South pole lengths may be of lesser arcuate extent, so long as the leading edges of the sensed portions thereof are separated by alternating arcuate lengths of 30° and 60° within the 90° segments of the magnetic ring.

Alternatively, as aforementioned, the four sets of sensed elements may be in the form of a rotor-mounted ring shutter and the sensing means may be light emitter-detectors, if optical sensing is to be employed for commutation.

Although the motor and motor control features of the present invention have been specifically described in connection with their use in driving individual yarn spindle assemblies of a textile ring spinning frame, it is to be understood that the motor and motor control features may be widely employed in any and all uses of three-phase VR motors of the type described employing means for detection and signal of rotor/stator positions for commutation of the motor phases.

That which is claimed is:

1. In a three-phase variable reluctance motor having a rotor with 4 rotor poles, a stator with 6 stator poles, windings on each of the stator poles, sensed means disposed around the axis of rotation of the rotor and fixed for rotation with the rotor and rotor poles, sensing means stationary with the stator and adjacent the path of movement of the rotor to detect the rotor sensed means and to provide an indicating signal of the position of the rotor poles relative to the stator poles; the improvement therein wherein said sensed means comprises 4 sets of elements, each set located within an arcuate length of 90°, each of the sets having two sensed portions, each sensed portion having a leading edge in the direction of rotation, with the leading edges of all the sensed portions of the sets being separated by consistently alternating arcuate lengths of 30° and 60°, and said sensing means comprises 2 sensors, the sensors being arcuately separated by 30° times n, wherein n is 1, 2, 4, or 5.

2. The motor as defined in claim 1 wherein said sensed means comprises magnetic means, and said sensing means comprises Hall effect sensors.

3. The motor as defined in claim 2 wherein said magnetic means comprises a ring magnet having four sets of alternating North and South poles mounted for rotational movement with the rotor about the rotor axis.

4. A motor as defined in claim 3 wherein said North and South poles are of unequal length, and wherein the longer of the North or South poles of the magnet each has an arcuate length of 60° and the shorter of the North or South poles each has an arcuate length of 30°.

* * * * *

UNITED STATES PATENT AND TRADEMARK OFFICE
CERTIFICATE OF CORRECTION

PATENT NO. : 5,148,070
DATED : September 15, 1992
INVENTOR(S) : Jesse C. Frye and Scott G. Bradshaw It is certified that error appears in the above-identified patent and that said Letters Patent is hereby corrected as shown below:

On title page, item [75], the addresses of the
    inventors should be corrected, as follows:

--Jesse C. Frye
      Cliffside, NC;
      Scott G. Bradshaw
      Chester, VA--

Signed and Sealed this

Fourteenth Day of September, 1993

Attest:

BRUCE LEHMAN

*Attesting Officer*      *Commissioner of Patents and Trademarks*